Patented Apr. 3, 1923.

1,450,392

UNITED STATES PATENT OFFICE.

JAMES M. SHERMAN AND EARLE O. WHITTIER, OF WASHINGTON, DISTRICT OF COLUMBIA, DEDICATED, BY MESNE ASSIGNMENTS, TO THE PEOPLE OF THE UNITED STATES.

PROCESS FOR THE PURIFICATION OF PROPIONATES BY THE ACTION OF BACTERIA.

No Drawing. Application filed August 26, 1922. Serial No. 584,540.

(FILED UNDER THE ACT OF MARCH 3, 1883, 22 STAT. L., 625.)

*To all whom it may concern:*

Be it known that we, JAMES M. SHERMAN and EARLE O. WHITTIER, citizens of the United States of America and employees of the Department of Agriculture of the United States of America, residing at Washington, D. C., have invented a new and useful Process for the Purification of Propionates by the Action of Bacteria, of which the following is a specification.

This application is made under the act of March 3, 1883, chapter 143 (22 Stat., 625) and the invention herein described and claimed may be used by the Government of the United States, its officers and employees, and by any person in the United States either in public or private work without payment to us of any royalty thereon.

Our invention relates to the purification of propionates from acetates and salts of other fermentable organic acids by the action of bacteria.

We have found that certain organisms which decompose acetates decompose propionates very slowly, or not at all. We have found it possible to decompose the acetates in a solution of a mixture of propionates and acetates, and thus to obtain the propionate in a substantially pure condition. The organisms for purification purposes may be introduced into a media in which propionates are being produced by the propionic organisms, or the propionic fermentation may be carried out by means of a pure culture of the propionic organism, the media then sterilized, and the purifying organism introduced as a pure culture. This method of purification is not confined to propionates produced by fermentation, but may be used for the purification of propionates produced by other methods and containing acetates or other fermentable contaminating organic salts.

The organisms which may be used in this process of purification of propionates are substantially included in the following classes, but this statement is not to be construed as limiting the operation of this invention to the use of organisms of the classes specifically named:—1. Those organisms of proteolytic nature, which have the power to ferment salts of organic acids, of which class *Proteus vulgaris* is an example; 2. The acid-destroying organisms which are not proteolytic in nature, but which actively destroy organic salts, of which class *Bacterium alcaligenes* is an example.

We claim:

1. The purification of propionates by bacterial action of *Proteus vulgaris* on acetates.

2. The purification of propionates by bacterial action of *Proteus vulgaris* on salts of fermentable organic acids.

3. The purification of propionates by bacterial action of *Bacterium alcaligenes* on acetates.

4. The purification of propionates by bacterial action of *Bacterium alcaligenes* on salts of fermentable organic acids.

JAMES M. SHERMAN.
EARLE O. WHITTIER.